United States Patent [19]

Adler

[11] Patent Number: 4,807,733

[45] Date of Patent: Feb. 28, 1989

[54] SYNCHRONIZING MECHANISM FOR A GEARBOX

[75] Inventor: Horst F. Adler, Södertälje, Sweden

[73] Assignee: Saab-Scania Aktiebolag, Sodertalje, Sweden

[21] Appl. No.: 28,585

[22] Filed: Mar. 20, 1987

[30] Foreign Application Priority Data

Mar. 20, 1986 [SE] Sweden .................................. 8601304

[51] Int. Cl.[4] .............................................. F16D 23/08
[52] U.S. Cl. .................................... 192/53 F; 192/67 A
[58] Field of Search .................. 192/53 F, 53 R, 53 E, 192/53 G, 67 A

[56] References Cited

U.S. PATENT DOCUMENTS

| 2,515,010 | 7/1950 | Kishline | 192/53 G |
|---|---|---|---|
| 3,272,291 | 9/1966 | Flinn | 192/53 F |
| 4,445,602 | 5/1984 | Chana | 192/53 F |

FOREIGN PATENT DOCUMENTS

| 1906863 | 8/1970 | Fed. Rep. of Germany . | |
|---|---|---|---|
| 1910884 | 9/1970 | Fed. Rep. of Germany . | |
| 1385860 | 12/1964 | France | 192/53 F |
| 2556437 | 6/1985 | France | 192/53 R |
| 1102991 | 2/1968 | United Kingdom | 192/53 F |
| 1125946 | 9/1968 | United Kingdom . | |

Primary Examiner—Rodney H. Bonck
Assistant Examiner—David A. Testardi
Attorney, Agent, or Firm—Cushman, Darby & Cushman

[57] ABSTRACT

A synchronizing mechanism in a gearbox, preferably for vehicles. The synchronizing mechanism includes an outer synchronizing ring formed with exterior detent teeth and limited rotatability relative a driving disc attached to a shaft. The mechanism also includes an intermediate synchronizing ring which is non-rotatably attached to a gear rotatably mounted on the shaft, and an inner synchronizing ring. The inner and the outer synchronizing rings are joined to each other for torque transmission, the torque acting on the inner synchronizing ring during the synchronizing phase being transferred to the outer synchronizing ring and causing the outer synchronizing ring to rotate relative the driving disc into a detent position. In the detent position, the detent teeth prevent axial displacement of a clutch collar surrounding the driving disc, and thereby engagement of the clutch collar with the gear. Since a large torque acts on the outer synchronizing ring it is possible to implement engagement teeth on associated parts with a relatively acute angle, resulting in that lesser engagement force is required after the synchronizing phase, thus enabling the gearbox to have easy gear-changing.

8 Claims, 2 Drawing Sheets

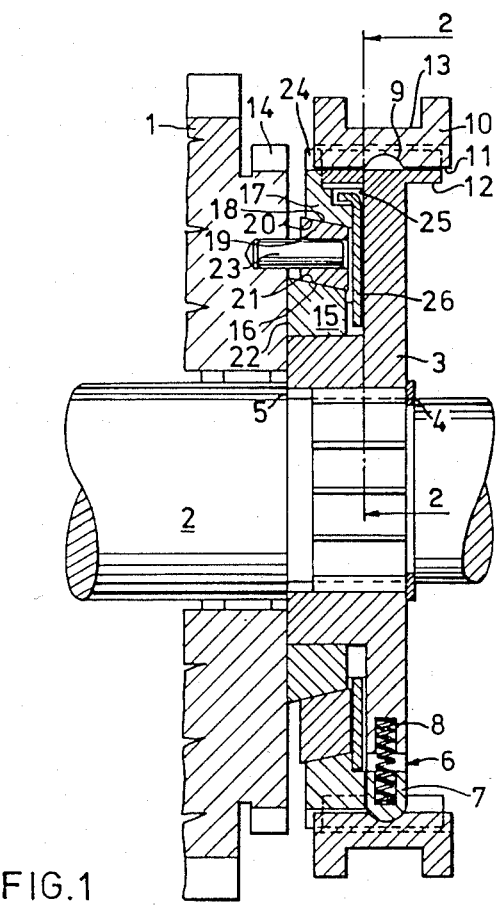
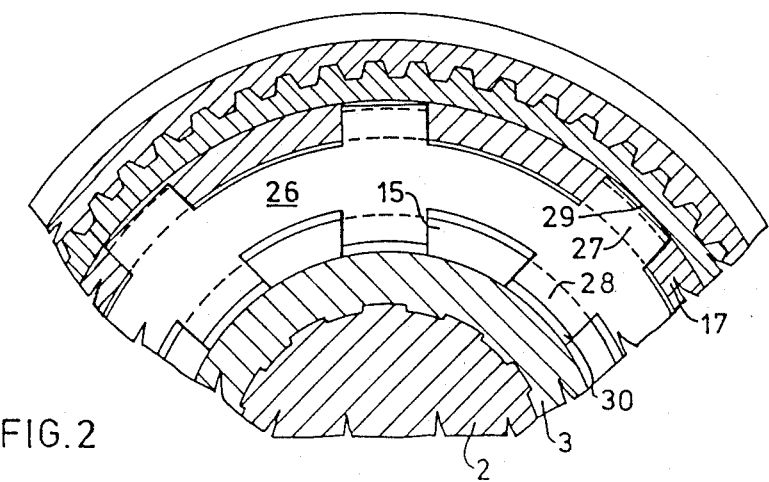

SYNCHRONIZING MECHANISM FOR A GEARBOX

BACKGROUND OF THE INVENTION

The invention relates to a synchronizing mechanism for a gearbox, including a driving disc which is non-rotatably mounted on a shaft and is surrounded by a clutch collar non-rotatably connected to the disc, the clutch collar being axially displaceable for engaging with a gear rotatably mounted on the shaft, during which engagement there is coaction with the synchronizing mechanism.

In gearboxes, it is usual to arrange a plurality of gears rotatably mounted on a shaft and in constant mesh with a corresponding number of gears rigidly attached to another shaft. Different gear ratios for the gearbox are obtained by alternatively engaging the rotatably mounted gears with their shaft. With the object of facilitating such engagements, it is usual to arrange synchronizing mechanisms, functioning during gear-changing operations such as to enable the gear which is to be engaged with the shaft to be given the same rotational velocity as the shaft before engagement takes place. Such synchronizing mechanisms can be implemented in different ways, but usually the elements which are to be mutually engaged are each provided with a conical friction surface. By axial displacement of at least one of the elements, the friction surfaces are brought into such gliding and engagement against each other that the elements assume the same rotational velocity.

For preventing during synchronizing phases that engagement takes place before velocity equilibrium has been obtained, the synchronizing mechanism also includes detent elements. A usual form of such a detent element comprises circumferentially arranged teeth on one of the so-called synchronizing rings, said teeth assuming a detent position during the angular movement of the synchronizing ring during the synchronizing phase such as to prevent axial displacement of a clutch collar non-rotatably mounted on the shaft. The teeth on the synchronizing ring are formed with sloping end surfaces which abut complementally sloping end surfaces on the detent teeth on the clutch collar. After synchronization has been attained, the axial force of the clutch collar is sufficient to give, via the sloping end surfaces, the synchronizing ring an angular movement into a non-detent position such that the clutch collar may be axially displaced into engagement with detent teeth on the relevant gear in the gearbox.

The slope of the teeth end surfaces is dimensioned against the background that a more acute inclination of the surfaces results in less force being required for engagement after synchronization, while a more obtuse slope results in a more reliable detent action during the synchronizing phase. As a rule, the latter situation has higher priority, this resulting in the drawback with the gearbox that gear-changing can be experienced as heavy. In dimensioning synchronizing mechanisms, rapid and smooth synchronization is often striven for as well as low operating forces. In gearboxes for heavy vehicles, for example, there are large forces and moments which require great consideration. To achieve a large synchronizing torque from a limited operating force and also to keep the dimensions within reasonable limits, it is known to arrange a plurality of synchronizing rings in the same synchronizing mechanism. Two synchronizing rings are usually used in such a case, an outer ring formed according to the same principle as described above and an inner ring which is non-rotatably attached to a driving member on the shaft. Both synchronizing rings have their friction surfaces acting on a friction ring non-rotatably attached to the gear and between the two synchronizing rings. The friction ring is formed with both an outer and an inner friction surface.

Synchronization with two synchronizing rings is often called double-cone synchronization, and the apparatus for performing a double-cone synchronizing mechanism. A disadvantage with the double-cone synchronizing mechanism is that only the outer synchronizing ring is formed with detent teeth. The torque acting on the outer synchronizing ring during the synchronizing phase is only a part of the total torque, i.e. the so-called synchronizing torque, which acts between the participating units. To ensure detent action during synchronization, it is therefore required that the angle between the surfaces of the teeth is formed relatively obtuse. However, this results in the drawback mentioned above, which is that great force is required for engagement and that the gear-changing action of the gearbox may be experienced as heavy.

SUMMARY OF THE INVENTION

The present invention has the object of solving these problems in known embodiments with double-cone synchronizing mechanisms. It is thus sought to provide a gearbox which only requires a small engagement force and as a result thereof can be regarded as having a light gear-changing action. At the same time, it is also sought to provide rapid and gentle synchronization with small space requirements, and using apparatus which is in addition comparatively simple and cheap to produce. With these requirements in mind, the inventive synchronizing mechanism includes an outer synchronizing ring, which is arranged limitedly rotatable relative the driving disc, and formed with external detent teeth and an inner friction surface, an intermediate synchronizing ring non-rotatably attached to the gear and formed with an outer and an inner friction surface, and an inner synchronizing ring formed with an outer friction surface. During the synchronizing phase the friction surfaces of the outer and inner synchronizing rings are caused to glide against the friction surfaces of the intermediate synchronizing ring. The invention is thus characterized by the outer and the inner synchronizing rings being mutually joined for torque transmission with the aid of a reaction disc, torque acting on the inner synchronizing ring during the synchronizing phase being transmitted to the outer synchronizing ring and coacting with torque acting on the outer synchronizing ring for giving the latter limited angular movement relative the driving disc such as to bring it into a position where its detent teeth prevent the axial displacement of the clutch collar.

In an embodiment of the synchronizing mechanism, the entire so-called synchronizing torque is thus transmitted to the outer synchronizing ring. During synchronization this torque will be sufficiently large to turn and retain the synchronizing ring in the detent position, even if the angle between the surfaces of the teeth is made relatively acute. The invention thus allows the angle of the engaging teeth to be made more acute, so that gear-changing with the gearbox will be consequently easier.

BRIEF DESCRIPTION OF THE DRAWINGS

Further distinguishing features of the invention will be apparent from the following description of an advantageous embodiment of the invention. The description is made with reference to the accompanying drawings, on which FIG. 1 shows in its upper and its lower part two different axial partial cross sections of an inventive synchronizing mechanism, FIG. 2 is a radial section 2—2 according to FIG. 1.

DETAILED DESCRIPTION

Figure 3:
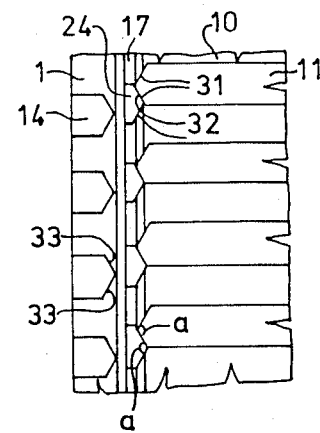
FIG. 3 illustrates the principle coaction between engagement teeth included in a synchronizing mechanism in a detent position.

The exemplifying figures illustrate parts of a gearbox intended for heavy vehicles. The gearbox includes a plurality of gears journalled on a shaft, each gear being in constant mesh with a complemental gear rigidly attached to another shaft (not shown). Different gearing alternatives for the gearbox are engaged by the rotatably mounted gears alternatively being fixed to the shaft. FIG. 1 shows one of the rotatably mounted gears 1 on the one shaft 2, this gear 1 having teeth meshing with a gear (not shown) on the other shaft. A driving disc 3 is non-rotatably mounted on the shaft 2 with the aid of splines, such as to be axially positioned on the shaft 2 between a circlip 4 and a shoulder 5.

The driving disc 3 is formed with four angularly uniformly distributed recesses 6, extending radially outwards for the entire width of the driving disc 3. These recesses 6, of which only one is illustrated in FIG. 1, each accommodate a detent body 7, providing a radially outwardly directed force under the action of a compression spring 8. One end of the compression spring 8 is accommodated in a bore in the detent body 7. The detent bodies 7 have a substantially cylindrical shape, which tapers off in a radially outward direction. The bodies 7 are adapted to fit into an annular groove 9 in a clutch collar 10 surrounding the driving disc 3, the groove 9 being formed with sloping side surfaces. The clutch collar 10 is formed with internal, axial engagement teeth 11, which are continuously in mesh with complemental external teeth 12 on the driving disc 3, thus providing mutual non-rotatable engagement between these two parts.

The clutch collar 10 is also formed with an external annular groove 13, in which an unillustrated engaging fork is arranged to operate. The engaging fork is part of an operating mechanism, with the aid of which the clutch collar 10 may be axially displaced to and from engagement with the gear 1. For this reason the gear 1 is formed with engagement teeth 14 for meshing with the engagement teeth 11 on the clutch collar 10.

A synchronizing mechanism is arranged between the driving disc 3 and gear 1. The mechanism includes an inner synchronizing ring 15 with an exterior conical friction surface 16, an outer synchronizing ring 17 with an interior conical friction surface 18 and an intermediate double-cone synchronizing ring 19 having respectively an exterior and an interior conical friction surface 20 and 21. The inner synchronizing ring 15 includes a side face 22 facing towards the gear 1 and constituting a friction surface. The inner synchronizing ring 15 is arranged for free movement about a hub portion of the driving disc 3.

The intermediate synchronizing ring 19 is formed with a plurality of axial bores for accommodating a corresponding number of locating pins 23 rigidly fastened on the gear 1. The synchronizing ring 19 is thus non-rotatably attached to the gear 1 via the locating pins 23. On the other hand, the locating pins 23 are a sliding fit in the bores in the synchronizing ring 19, which is thus axially movable relative the gear 1.

The outer synchronizing ring 17 is provided with detent teeth 24 on its circumference, and in accordance with the following description of the synchronizing phase, these detent teeth prevent the clutch collar 10 from being engaged with the engagement teeth 14 on the gear 1. The synchronizing ring 17 is further formed with four axial abutments 25 which are accommodated in the four recesses 6 of the driving disc 3, the detent bodies 7 axially abutting said abutments 25. In a tangential direction the abutments 25 are narrower than the recesses 6, thus allowing limited relative angular movement between the driving disc 3 and synchronizing ring 17. Apart from the availability of this relative rotation, the synchronizing ring 17 is non-rotatably attached to the driving disc 3.

In accordance with the present invention, the synchronizing mechanism also includes a reaction disc 26, which is suitably fabricated from pressed sheet metal. The reaction disc 26 is substantially annular and is formed with respectively radially outwardly and radially inwardly directed flaps 27 and 28. The radially outwardly directed flaps 27 also have their outer ends directed axially, as illustrated in FIG. 1. These flaps 27,28 are accommodated in, and coact with, corresponding recesses 29,30 in the outer and inner synchronizing rings 17 and 15 such as to obtain torque transmitting union between these rings. For this reason the outer synchronizing ring 17 is formed with recesses 29 having both radial and axial extension.

The inner synchronizing ring 15 has recesses 30 with substantially axial extension. Between the recesses 28,29 in the respective synchronizing rings 17,15 there are thus formed axial abutments which in a similar way as a dog clutch engage the flaps 27,28 of the reaction disc 26 to form a non-rotatable union. The reaction disc 26 is movable in an axial direction, both relative the outer as well as the inner synchronizing ring 17,15. It is, however, essential that the reaction disc 26 is axially movable relative to at least one of the outer or the inner synchronizing rings 17,15, and there should therefore be a certain amount of clearance between the flaps 27,28 of the reaction disc and the accommodating recesses 29,30 in the synchronzing rings.

On the union of the shaft 2 with the gear 1 the synchronizing mechanism functions in the following manner: it is assumed that the shaft 2 and the gear 1 originally had different rotational speeds. The engagement movement is initiated by the clutch collar 10 being moved towards the gear 1, i.e. to the left in FIG. 1. The detent bodies 7 are then also acted on by an axial force, which by engagement against the abutments 25 of the outer synchronizing ring 17 also urges it axially into engagement with the intermediate synchronizing ring 19. This ring is mounted for axial movement on the locating pins 23, and is thus given an axial movement such as to come into engagement with the inner synchronizing ring 15. Also this ring is axially movable but is finally caused to engage its side face 22 against the gear 1. Gliding then occurs between the side face 22 of the inner synchronizing ring 15 and the gear 1, between the exterior friction surface 16 of the inner synchronizing ring 15 and the interior surface 21 of the intermediate synchronizing ring 19 and also between the exterior surface 20 of the synchronizing ring 19 and the interior surface 18 of the outer synchronizing ring 17.

Figure 4:
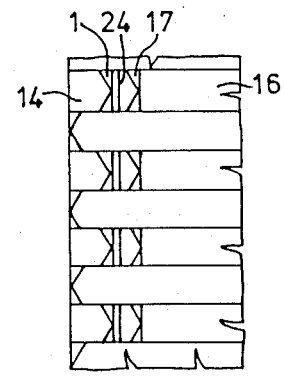
FIG. 4 shows the parts in FIG. 3 in an engaged position.

The rotational speed of the more quickly rotating parts will be braked in the gliding between the different friction surfaces 16,18,20,21,22, while the parts rotating more slowly will be accelerated. The parts thus act on each other with a so-called synchronizing torque. This results in that the outer synchronizing ring 17 is given a slight rotation relative the driving disc 3, such that the abutments 25 accommodated in the recesses 6 come into engagement against a side surface in the respective recess. FIGS. 3 and 4 illustrate the relative positions of the respective coacting engagement teeth 11, 24 and 14 on the clutch collar 10, outer synchronizing ring 17 and the gear 1. FIG. 3 illustrates the outer synchronizing ring 17 slightly rotated relative the clutch collar 10. In this position the clutch collar 10 is locked against continued movement towards the gear 1 by sloping end surfaces 31 on the engagement teeth 11 of the clutch collar engaging against sloping end surfaces 32 on the detent teeth 24 of the synchronizing ring 17.

In this detent position the axial operating force acting on the clutch collar 10 is transmitted via the sloping end surfaces 31,32 to the outer synchronizing ring 17. This results in that the respective friction surfaces of the synchronizing rings 15,17,19 are further urged together and caused to glide against each other.

The axial force which the engagement mechanism exerts on the clutch collar 10 is transferred by the mutual abutment of the engagement teeth 11 and detent teeth 24 to a torque acting on the outer synchronizing ring 17. This torque is counter-directed the synchronizing torque and strives to turn the outer synchronizing ring 17 into a non-detent position. In accordance with the present invention, the outer and the inner synchronizing rings 17,15 are mutually united for torque transmission, and during the synchronizing phase this results in that the torque acting on the inner synchronizing ring 15 is also transmitted to the outer synchronizing ring 17. There is thus ensured that the outer synchronizing ring 17 is acted on by a sufficiently large torque to keep it in the detent position in spite of the counter-directed torque from the clutch collar 10.

When synchronization is complete, all parts included in the synchronizing mechanism rotate at the same speed. The torque coming from the clutch collar 10 and acting on the outer synchronizing ring 17 is then sufficiently large to rotate the synchronizing ring 17 relative the driving disc 3 into a non-detent position. By further axial movement, the internal engagement teeth 11 on the clutch collar 10 can then come into mesh with the engagement teeth 14 on the gear 1, the shaft 3 and the gear 1 then being mutually non-rotatably united, as illustrated in FIG. 4. Simultaneously with this engagement movement the detent bodies 7 in the driving disc 3 are urged inwards, while the detent bodies 7 glide out of the groove 9 on the inside of the clutch collar 10.

The engagement teeth 14 on the gear 1 are also formed with sloping end surfaces 33 to facilitate, if necessary, relative rotation between the collar 10 and the gear 1 during engagement. The sloping end surfaces on the engagement teeth 33 of the gear 1 also have the same angle a as the detent teeth 24 on the synchronizing ring 17, and, in accordance with this embodiment, the engagement teeth 11 on the clutch collar 10 also. The angle a is advantageously between 90 and 100 degrees.

During the described synchronizing and engaging phase, these angles a on the sloping surfaces 31,32,33 on respectively the engagement teeth 11,14 and detent teeth 24 are of great importance. A more acute angle a results in that a larger portion of the axial force from the clutch collar 10 can be transferred to a torque which turns the synchronizing ring 17 from the detent position. This results in that lesser force is required for engagement, and gear-changing with the gearbox is then experienced as light. In accordance with the present invention, a sufficiently large torque will act on the outer synchronizing ring 17 during the synchronizing phase to retain it in the detent position even when the sloping end surfaces 31,32,33 of the engagement teeth 11,14,24 have a relatively acute angle a. The invention thus also permits that the gearbox can provide light gear-changing simultaneously as engagement during the synchronizing phase is prevented.

During the engagement phase, rotation of the outer synchronizing ring 17 and the gear 1 in relation to the driving disc 3 is counteracted by the frictional force between the synchronizing rings 15,17,19. Such forces are no longer desirable after synchronous rotation has been achieved, since they result in an increased requirement of force for the engaging movement. For this reason it is desirable that the engagement of the friction surfaces 16,18,20,21,22 against each other ceases after the synchronizing phase. In the presently described example, the reaction disc 26 is axially movable both relative the outer and the inner synchronizing rings 17,15. This ensures that after synchronization the synchronizing rings 15,17,19 can move axially, substantially to inhibit engagement between the friction surfaces 16,18,20,21,22.

Within the scope of the accompanying claims the invention can be modified and implemented differently from what has been described for the embodiment above.

What is most essential for the invention is coaction and the torque transmitting connection between the outer and the inner synchronizing rings 17,15. This means that the implementation of other parts in the synchronizing mechanism has less importance. For example, the implementation of the driving disc 3, detent bodies 7 and clutch collar 10 can therefore be carried out in accordance with other known synchronizing mechanisms.

Similarly, the gear 1 and the engagement teeth 14 coacting with it may be implemented by two mutually non-rotatably joined parts instead of comprising a single part.

The illustrated embodiment solely illustrates a synchronizing mechanism and one gear. In accordance with what is customary for vehicle gearboxes, a further gear and synchronizing mechanism can be arranged on the other side of the driving disc, whereby a plurality of parts can be common to both synchronizing mechanisms.

In the description of the embodiment above, it is stated that the synchronizing mechanism includes an intermediate synchronizing ring which is surrounded by an outer and an inner synchronizing ring. This does not exclude the situation where the same synchronizing mechanism can include still further synchronizing rings, such as is known per se. Within the same modification possibility, the outer and/or the inner synchronizing ring may be formed as a parted synchronizing ring. Still further modifications are possible within the scope of the inventive concept.

I claim:

1. A synchronizing mechanism for a gearbox which includes a driving disc which is non-rotatably mounted on a shaft and is surrounded by a clutch collar non-rotatably connected to the disc, the clutch collar being axially displaceable for engaging with a gear rotatably mounted on the shaft, said synchronizing mechanism including:
  an outer synchronizing ring which is limitedly rotatable relative to the driving disc and formed with exterior detent teeth and an inner friction surface;
  an intermediate synchronizing ring non-rotatably connected to the gear and formed with an outer and an inner friction surface; and
  an inner synchronizing ring formed with the outer friction surface, the friction surfaces of the outer and the inner synchronizing rings being caused to glide, in use, against the friction surfaces of the intermediate synchronizing ring during a synchronizing phase;
  the outer and the inner synchronizing rings being joined to each other for torque transmission with the aid of a reaction disc having a first set of tabs engaging in recesses in the outer synchronizing ring and a second set of tabs engaging in recesses in the inner synchronizing ring, so that torque acting on the inner synchronizing ring during the synchronizing phase is transferred to the outer synchronizing ring and coacts with torque acting on the outer synchronizing ring for causing limited rotation of the outer synchronizing ring relative to the driving disc to a position where the exterior detent teeth on the outer synchronizing ring directly engage teeth on the clutch collar and prevent axial displacement of the clutch collar.

2. A synchronizing mechanism as claimed in claim 1, wherein:
  the reaction disc is arranged to be axially displaceable relative to at least one of the inner and outer synchronizing rings.

3. A synchronizing mechanism as claimed in claim 2, wherein:
  the reaction disc is arranged to be axially displaceable relative to both the inner and the outer synchronizing rings.

4. A synchronizing mechanism as claimed in claim 2, wherein:
  the reaction disc is formed from sheet metal.

5. A synchronizing mechanism as claimed in claim 1, wherein:
  said tabs of said first set of tabs are directed axially of said reaction disc.

6. A synchronizing mechanism as claimed in claim 1, wherein:
  said tabs of said second set of tabs are directed radially inwardly.

7. A gearbox, including:
  a driving disc which is non-rotatable mounted on a shaft and is surrounded by a clutch collar non-rotatably connected to the disc, the clutch collar being axially displaceable for engaging with a gear rotatably mounted on the shaft, said synchronizing mechanism including:
  an outer synchronizing ring which is limitedly rotatable relative the driving disc and formed with exterior detent teeth and an inner friction surface;
  an intermediate synchronizing ring non-rotatably connected to the gear and formed with an outer and an inner friction surface; and
  an inner synchronizing ring formed with the outer friction surface, the friction surfaces of the outer and the inner synchronizing rings being caused to glide, in use, against the friction surfaces of the intermediate synchronizing ring during a synchronizing phase;
  the outer and the inner synchronizing rings being joined to each other for torque transmission with the aid of a reaction disc having a first set of tabs engaging in recesses in the outer synchronizing ring and a second set of tabs engaging in recesses in the inner synchronizing ring, so that torque acting on the inner synchronizing ring during the synchronizing phase is transferred to the outer synchronizing ring and coacts with torque acting on the outer synchronizing ring for causing limited rotation of the outer synchronizing ring relative to the driving disc to a position where the detent teeth on the outer synchronizing ring directly engage teeth on the clutch collar and prevent axial displacement of the clutch collar.

8. A gearbox as claimed in claim 7, wherein:
said synchronizing mechanism includes only three synchronizing rings, namely said outer, inner and intermediate synchronizing rings; and
said reaction disc faces said driving disc, whereby simple connection of said intermediate synchronizing ring and said gear is facilitated.

* * * * *